US010415989B2

(12) United States Patent
Bansal et al.

(10) Patent No.: US 10,415,989 B2
(45) Date of Patent: Sep. 17, 2019

(54) NAVIGATION PERSONALIZATION THROUGH ANALYSIS OF PRESENT AND HISTORICAL USER DATA

(71) Applicant: International Business Machines Corporation, Armonk, NY (US)

(72) Inventors: Rinkesh I. Bansal, Pune (IN); Sanjay B. Panchal, Mumbai (IN); Chintan Thaker, Pune (IN); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/257,145

(22) Filed: Sep. 6, 2016

(65) Prior Publication Data

US 2018/0066952 A1    Mar. 8, 2018

(51) Int. Cl.
*G01C 21/36* (2006.01)
*G01C 21/34* (2006.01)

(52) U.S. Cl.
CPC ..... *G01C 21/3641* (2013.01); *G01C 21/3484* (2013.01); *G01C 21/3676* (2013.01)

(58) Field of Classification Search
CPC .................. G01C 21/3641; G01C 21/3667
See application file for complete search history.

(56) References Cited

U.S. PATENT DOCUMENTS

| | | | |
|---|---|---|---|
| 5,359,527 A * | 10/1994 | Takanabe | G01C 21/3611 340/990 |
| 7,912,637 B2 | 3/2011 | Horvitz et al. | |
| 8,660,787 B2 * | 2/2014 | Minami | G01C 21/3484 340/988 |
| 8,799,799 B1 | 8/2014 | Cervelli et al. | |
| 9,310,213 B2 * | 4/2016 | Dave | G01C 21/3407 |
| 9,630,611 B1 * | 4/2017 | Dufford | B60W 10/06 |
| 9,631,944 B2 * | 4/2017 | Cho | G01C 21/3484 |
| 10,048,686 B2 * | 8/2018 | Brekke | G05D 1/0088 |
| 10,113,880 B2 * | 10/2018 | Nesbitt | G01C 21/367 |
| 10,168,177 B2 * | 1/2019 | Hinnegan | G01C 21/3697 |
| 10,198,748 B2 * | 2/2019 | Shahraray | G11B 27/034 |
| 10,203,219 B2 * | 2/2019 | Leblanc | G08G 1/096811 |
| 2011/0153191 A1 * | 6/2011 | Dhanani | G01C 21/3484 701/533 |
| 2011/0282702 A1 | 11/2011 | Mortimore, Jr. | |
| 2012/0053836 A1 * | 3/2012 | Iaccarino | G01C 21/3461 701/533 |

(Continued)

OTHER PUBLICATIONS

Goggle Maps; "Meet the new Google Maps"; YouTube; May 15, 2013; <https://www.youtube.com/watch?v=THxJHcR1D2c>.

(Continued)

*Primary Examiner* — Tuan C To
(74) *Attorney, Agent, or Firm* — Khyle J. Eaton; Brian M. Restauro

(57) ABSTRACT

Embodiments of the present invention provide systems and methods for personalizing a navigation route. The method includes receiving a request from a user for a navigation route between two or more points. The method further includes accessing navigation data and services, creating a generic navigation route, accessing route history and related data for the user, creating a personalized navigation route for the user, and displaying the personalized navigation route.

20 Claims, 5 Drawing Sheets

(56) References Cited

U.S. PATENT DOCUMENTS

| | | | |
|---|---|---|---|
| 2013/0166197 A1 | 6/2013 | Tseng et al. | |
| 2013/0204528 A1* | 8/2013 | Okude | G08G 1/096822 |
| | | | 701/533 |
| 2014/0195149 A1 | 7/2014 | Yang et al. | |
| 2014/0236472 A1* | 8/2014 | Rosario | G01C 21/3602 |
| | | | 701/400 |
| 2014/0365113 A1* | 12/2014 | McGavran | G01C 21/00 |
| | | | 701/425 |
| 2015/0006077 A1* | 1/2015 | Baid | G01C 21/3697 |
| | | | 701/533 |
| 2015/0032424 A1 | 1/2015 | Gupta et al. | |
| 2015/0081217 A1* | 3/2015 | Renz | G01C 21/32 |
| | | | 701/533 |
| 2015/0112585 A1* | 4/2015 | Knepper | G01C 21/3697 |
| | | | 701/410 |
| 2015/0201028 A1* | 7/2015 | Hinnegan | H04L 67/18 |
| | | | 709/217 |
| 2016/0341564 A1* | 11/2016 | Cheng | G01C 21/3641 |
| 2017/0232915 A1* | 8/2017 | Dufford | B60R 16/037 |
| | | | 701/48 |
| 2017/0314949 A1* | 11/2017 | Rovik | G01C 21/3461 |
| 2017/0350717 A1* | 12/2017 | Cheng | G01C 21/3453 |

OTHER PUBLICATIONS

Titlow, John Paul; "The Future of Google Maps: Social, Personalized and Way Smarter"; readwrite; May 15, 2013; 1 page; <http://readwrite.com/2013/05/15/the-future-of-google-maps-social-personalized-and-way-smarter>.

"Import info to your map"; My Maps Help; © 2016 Google; Printed Jul. 6, 2016; 2 pages; <https://support.google.com/mymaps/answer/3024836>.

\* cited by examiner

NAVIGATION PERSONALIZATION THROUGH ANALYSIS OF PRESENT AND HISTORICAL USER DATA

BACKGROUND OF THE INVENTION

The present invention relates generally to navigation and mapping systems, and more particularly to personalized route mapping based on a cognitive analysis of the user's information.

More and more people are using mobile mapping technology as the GPS and portable electronic mapping software becomes more ubiquitous. Mapping software allows users to input destinations, and the software produces a route or routes generally designed to be the most efficient. These routes are generally generic to every user who inputs the same set of mapping coordinates. The mapping software generally cannot determine if the user has taken the route before, or parts of the route, and does not know if the user knows the area. Even for mapping software that stores data for routes taken by the user previous, the mapped route is generally still the generic route that any user would receive from the software.

SUMMARY

According to one embodiment of the present invention, a method for personalizing a navigation route, the method comprising: receiving, by one or more processors, a request from a user for a navigation route between two or more points; accessing, by one or more processors, navigation data and services; creating, by one or more processors, a generic navigation route based, at least in part, on the request from the user and the navigation data and services; accessing, by one or more processors, route history and related data for the user; creating, by one or more processors, a personalized navigation route for the user based, at least in part, on the generic navigation route and the route history and related data for the user; and creating, by one or more processors, a personalized navigation route for the user based, at least in part, on the generic navigation route and the route history and related data for the user; and displaying, by one or more processors, the personalized navigation route for the user.

According to another embodiment of the present invention, a computer program product for personalizing a navigation route is provided, based on the method described above.

According to another embodiment of the present invention, a computer system for personalizing a navigation route is provided, based on the method described above.

DETAILED DESCRIPTION

Map and navigation software allow a user to not only see a map of most areas in the world, but to plot a course of travel between two or more points. These points may include, for example, where the user is currently located or where the user will be staying during a vacation, and a final destination, such as a restaurant or a friend's house. The navigation software generally allows a user to choose the method of travel they will be utilizing, such as a car, a train, on foot, etc., and produces a route or set of routes that the navigation software determines to be the most efficient. This determination may be due to multiple factors, including route length, congestion from traffic or construction work, tolls, etc. The navigation software generally produces a generic route that would be produced for any user requesting a route between the same two points.

Embodiments of the present invention recognize the need to personalize the map interface experience for a user. In some instances, generic routes may not be very useful for users. For example, a user may request a route from their house to a restaurant they have never visited before, and the streets may be poorly marked. In this instance, generic directions such as "turn down K Street" would not be overly helpful, if K Street was not clearly marked or not marked at all. In another example, the user may have been to a location previously, but has forgotten that it was that particular location they visited. In this example, a visual or auditory reminder may make it easier for the user to remember the route. Embodiments of the present invention recognize that current map interfaces can be lacking more personalized features that include visual and/or auditory reminders and provide solutions for cognitive analysis and customization of navigation software routes to the individual user. In this manner, as discussed in greater detail herein, embodiments of the present invention can provide a way to determine how to create personalized routes with various details and specifics helpful to the user.

Figure 1:
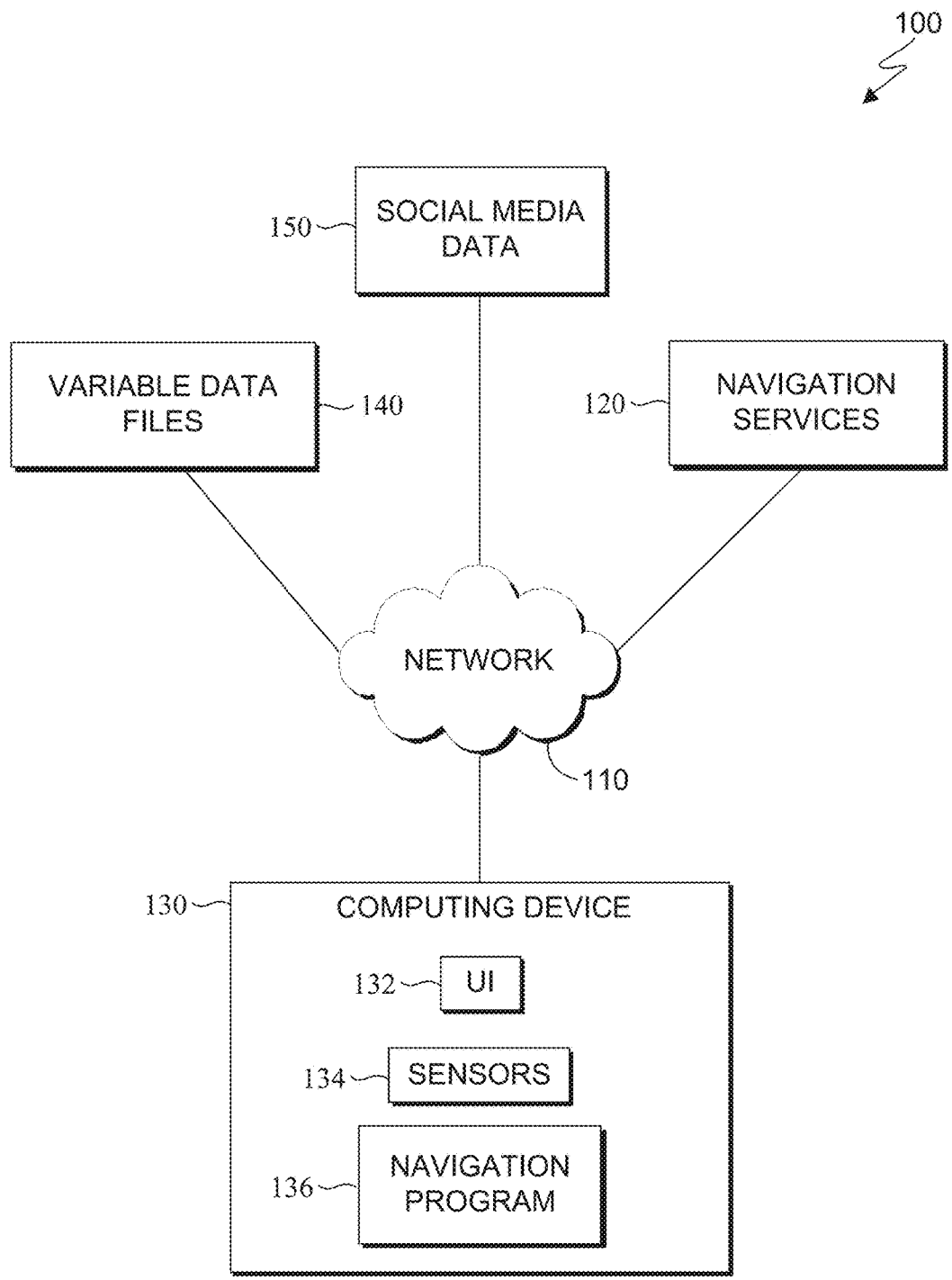
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. Modifications to data processing environment 100 may be made by those skilled in the art without departing from the scope of the invention as recited by the claims. In an exemplary embodiment, data processing environment 100 includes navigation services 120, computing device 130, variable data files 140, and social media data 150, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication and/or access between navigation services 120, computing device 130, variable data files 140, and social media data 150.

Navigation services 120, in accordance with an embodiment of the present invention, may include, but are not limited to: Global Positioning System (GPS) satellites, cloud or web based GPS software, cloud or web based maps and mapping software, and cloud or web based navigation software. In this exemplary embodiment, navigation services 120 are stored remotely, such as on a server (not depicted), and may be accessed via network 110. In other embodiments, navigation services 120 may be stored locally, such as on computing device 130, or configured to be stored locally when offline, or may be stored in a combination of local and remote storage methods.

Computing device 130 includes user interface (UI) 132, sensors 134, and navigation program 136. In various embodiments of the present invention, computing device 130 can be a laptop computer, a tablet computer, a netbook computer, a personal computer (PC), a desktop computer, a personal digital assistant (PDA), a smart phone, a thin client, or any programmable electronic device capable of executing computer readable program instructions. Computing device 130 may include internal and external hardware components, as depicted and described in further detail with respect to FIG. 4.

UI 132 is a user interface that can display text, documents, web browser windows, user options, application interfaces, and instructions for operation. In this embodiment, UI 132 may be, for example, a graphical user interface (GUI) or a web user interface (WUI). UI 132 may also include the information a program presents to a user (such as graphics, text, and sound) and the control sequences the user employs to control the program. UI 132 is capable of receiving data, user commands, and data input modifications from a user. UI 132 is also capable of communicating with sensors 134 and navigation program 136.

Sensors 134 may include any device capable of capturing data about a location, such as a camera, a microphone, GPS, Bluetooth, wireless local area network (WLAN), or a mobile phone positioning system. The location data may include, but is not limited to: digital images of the location and the area surrounding the location; words and conversations held at, and pertaining to, the location; time and date while at the location; and amount of times the user went to the location. In various embodiments, sensors 134 may be separate from computing device 130, such as a WLAN enabled camera or smart watch, and the data captured may be accessed later or streamed directly to computing device 130 while being captured, through WLAN, Bluetooth, a wired connection, or another connection type capable of data transfer.

Figure 2:
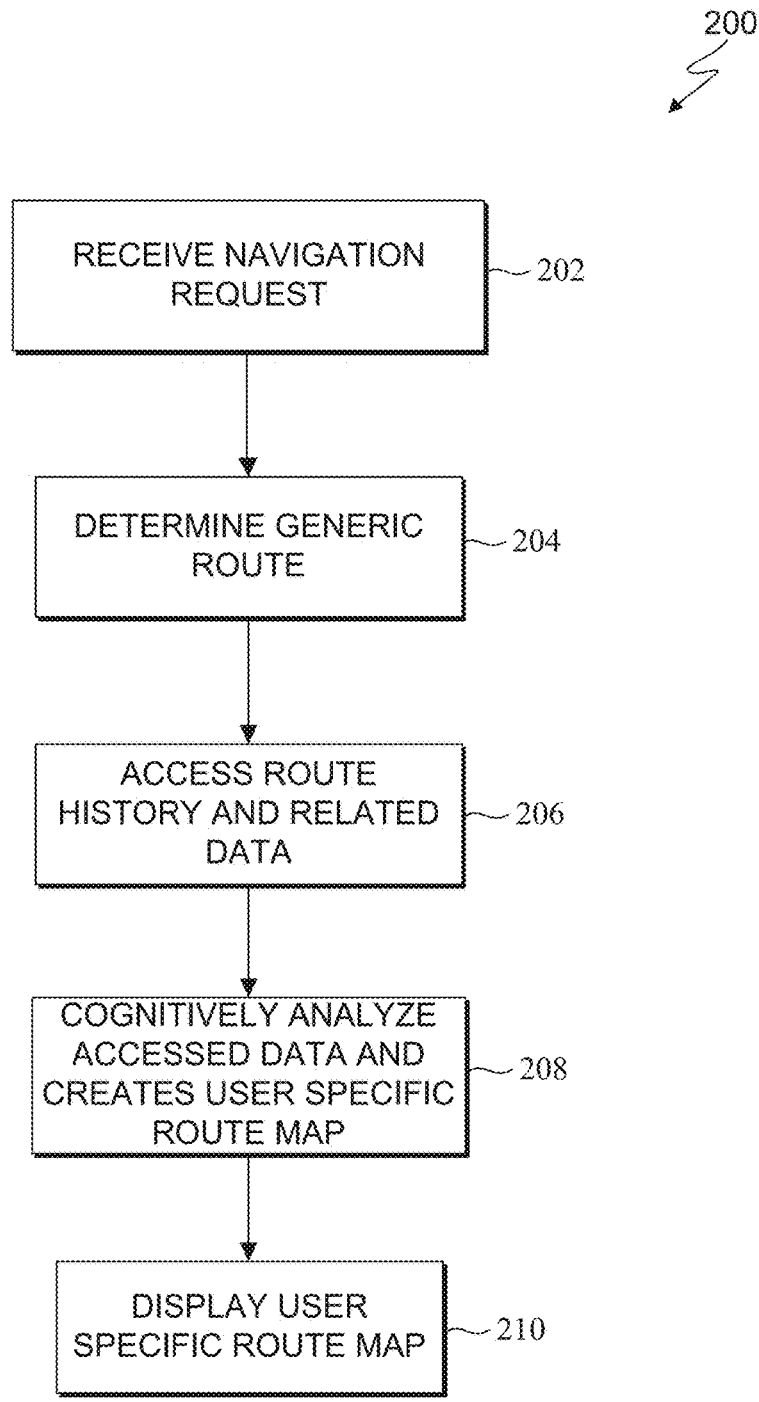
FIG. 2 is a flowchart illustrating operational steps for map personalization, in accordance with an embodiment of the present invention.
Figure 3A:
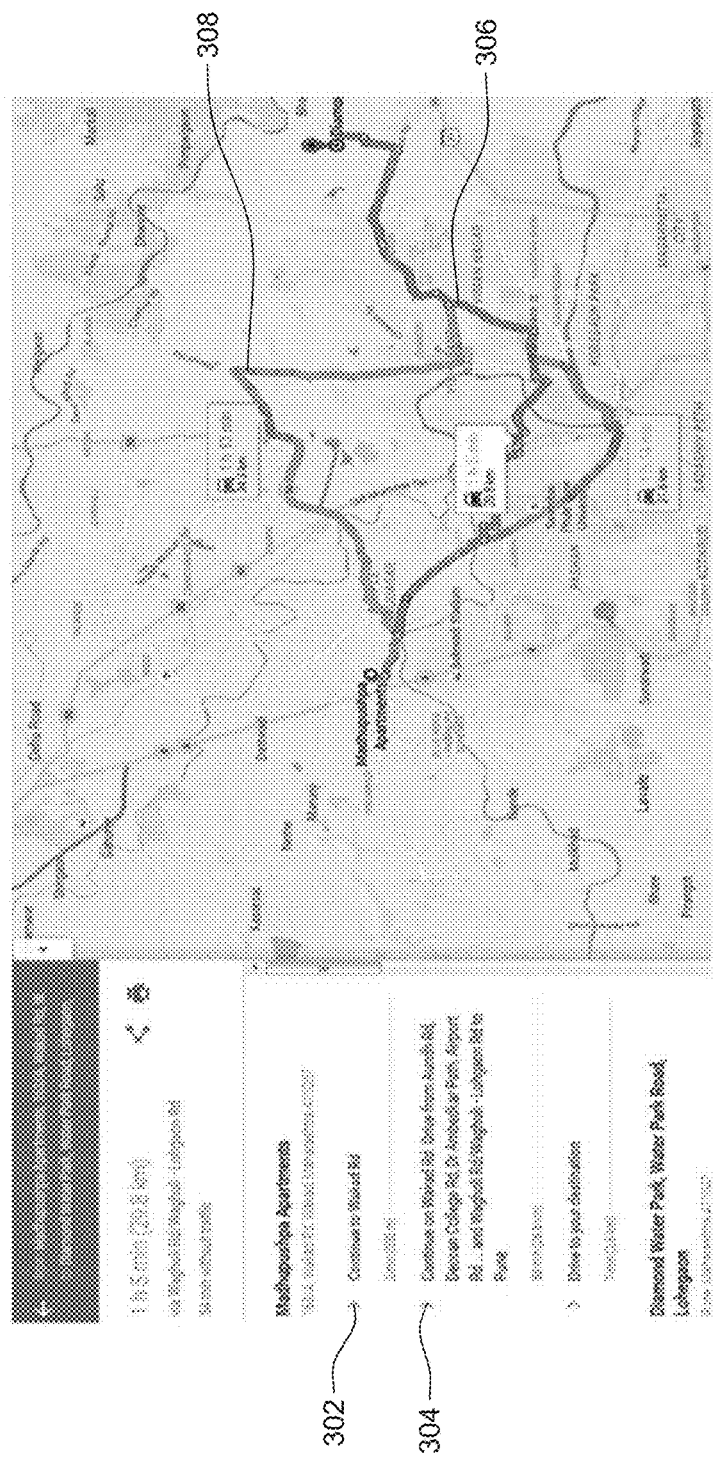
FIG. 3A is a visualization depicting an example of a generic navigation route, in accordance with an embodiment of the present invention.
Figure 3B:
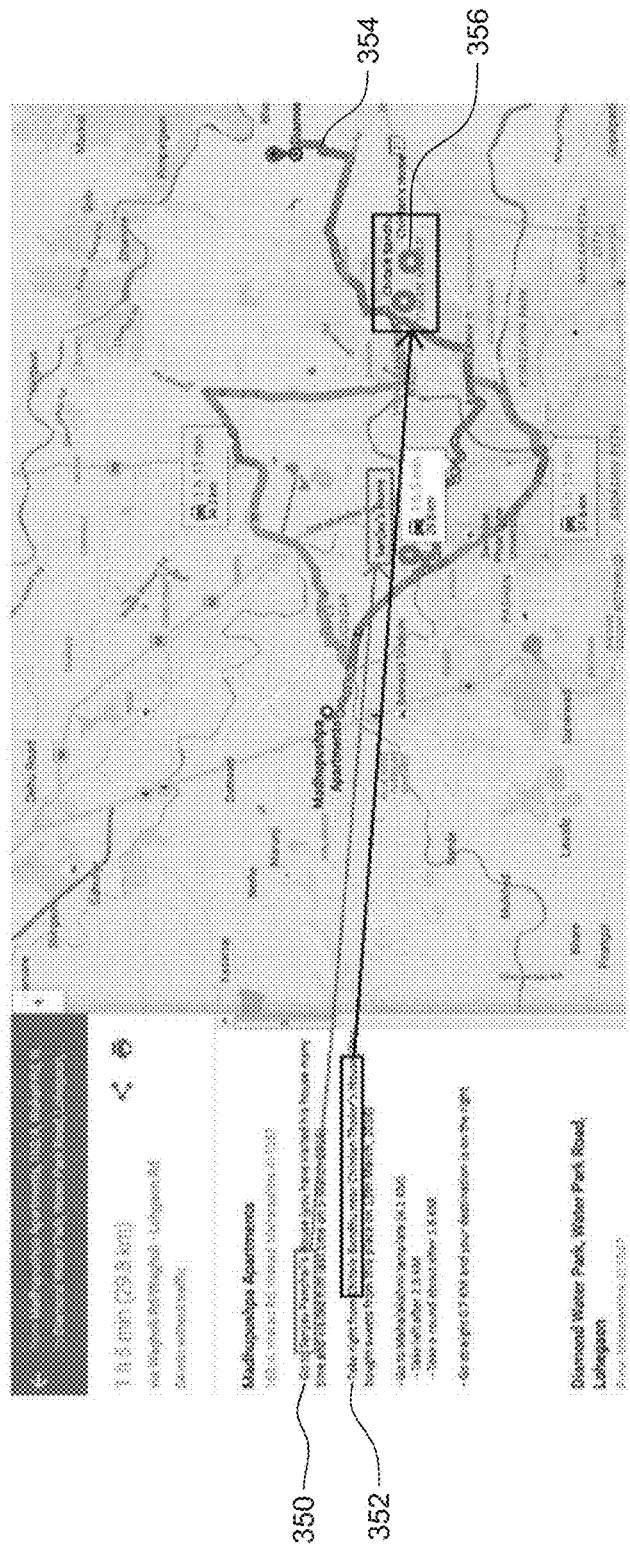
FIG. 3B is a visualization depicting an example of a personalized navigation route, in accordance with an embodiment of the present invention.

Navigation program 136 generates personalized maps and routes for the user based, at least in part, on an identified location, historical data, and cognitive analytics, as described in greater detail with regard to FIGS. 2, 3A, and 3B. In this embodiment, navigation program 136 generates personalized maps by receiving information from, and sending information to, sources such as navigation services 120, UI 132, sensors 134, variable data files 140, and social media data 150. In this exemplary embodiment, navigation program 136 is capable of retrieving and sending information via network 110. The capabilities of navigation program 136 may include, but are not limited to: accessing data from such sources as navigation services 120, sensors 134, variable data files 140 and social media data 150; determining the location of the user; determining the destination of the user; performing an analysis (e.g., a cognitive analysis) on data accessed, or connecting to a system that is capable of performing said analysis; and creating and displaying a personalized map and route for the user, as discussed in greater detail with regard to FIG. 2.

Variable data files 140, in accordance with an embodiment of the present invention, may include, but are not limited to: information for contacts (e.g., a cloud-based or synced address book); user's route history, such as past and present location data for a user, the user's previous routes and other data related to the user's route history; and location data (e.g., the data captured by sensors 134). In this exemplary embodiment, variable data files 140 are stored remotely, such as on a server (not depicted), and may be accessed via network 110. In other embodiments, variable data files 140 may be stored locally, for instance on computing device 130, or may be stored in a combination of local and remote storage methods.

Social media data 150, in accordance with an embodiment of the present invention, may include websites and applications that enable users to create, exchange, and share content and/or ideas and to participate in social networking and interconnected communities (e.g., online forums).

FIG. 2 is a flowchart 200 illustrating operational steps for personalizing a mapped route based on an analysis of present and historical user data, in accordance with an embodiment of the present invention.

In step 202, navigation program 136 receives a navigation request from a user. In this exemplary embodiment, navigation program 136 receives the request from the user through such sources as UI 132. In this embodiment, the navigation request may include a route to a destination from the user's current location, or a route to a destination from a different location that is input by the user. For example, if a user is at home and wants noodles and has heard that restaurant X has the best noodles, the user may input into navigation program 136 that the user wants to go to restaurant X. The user may then input the starting address as where they are currently (i.e., at their home). In another example, a user is on vacation the following week and wants to find a route to a friend's address from the hotel the user will be staying. The user may input into navigation program 136 that the user wants the final destination to be the friend's address. The user is then able to input into navigation program 136 that the starting address is the hotel's address that the user will be staying.

In step 204, navigation program 136 determines a generic route for the navigation request. In this embodiment, the generic route is an efficient route or routes that navigation program 136 would give to any user asking for the navigation points, and is determined through such means as travel time, road conditions, mode of transportation, etc. For example, when a user requests a route from their home to restaurant X, and would like to walk to restaurant X, navigation program 136 would determine an efficient, generic route that would allow for sidewalks and footpaths, while not taking the user through private property, into dangerous roadways, down sidewalks that are blocked due to construction, etc. If, for example, the user requests the same start and end points, but would like to travel by car, the generic route would no longer allow for sidewalks and footpaths, but rather streets that are not blocked due to construction, accidents, excessive traffic, etc. In this embodiment, the generic route determined by navigation program 136 would be the same basic generic route for any user requesting a route between the same two locations using the same form of transportation. In various embodiments, the means for determining the generic route, such as traffic patterns, are partially or fully determined by accessing navigation services 120.

In step 206, navigation program 136 accesses the user's route history and related data. In this exemplary embodiment, navigation program 136 accesses the user's route history and related data from such sources as computing device 130, variable data files 140, social media data 150, navigation services 120, or any combination thereof. In this exemplary embodiment, route history and related data may include, but is not limited to: routes taken by the user previously, especially those routes intersecting with the current navigation request; number of times a route was taken previously; a user's contact information, such as a contact's address, especially those along the predetermined generic route (i.e., step 204); previous dates and times that the user was at a contact's address that is along the route; digital images, videos, recordings, etc. that relate to the route, landmarks along the route, or were taken along the route (e.g., by sensors 134); and discussions by the user about the route itself or stops along the route, through spoken conversations (e.g., during phone calls, on voice recordings, or on video, such as from variable data files 140) or written conversations (e.g., through emails, text messages, SMS, or social media posts, such as from social media data 150). In various embodiments, the route history and related data may be stored locally on computing device 130, in variable data files 140, in social media data 150, or any combination thereof.

In step 208, navigation program 136 cognitively analyzes the accessed data and creates a user specific route map. In this embodiment, navigation program 136 cognitively analyzes the accessed data using natural language processing techniques. Examples of natural language processing techniques include sentence splitting, tokenization, POS tagging, chunking, dependency parsing, anaphora resolution, etc. In this exemplary embodiment, navigation program 136 cognitively analyzes the accessed route history and related data (i.e., step 206) to determine different types of user specific information that may be used to help personalize the route for the user. For example, if a generic route has a well-known landmark that the user has journeyed to before, and has perhaps even taken digital images of, navigation program 136 recognizes this information, parses through the digital images, cognitively determines related images that may show the landmark, pieces of the route to the landmark, or both, and utilizes this data when creating the user specific route map.

In another example, navigation program 136 can create a user specific route map that includes familiar (i.e., known) routes to an unknown destination. For example, the user has a friend that they go to see regularly. When the user inputs a navigation request, navigation program 136 determines that the generic route is actually part of a route the user has taken many times before to go to the friend's house and has a dash camera that has recorded, among other things, landmarks along the route during these travels. Although the friend's house is actually further than the requested final destination, through cognitive analysis, navigation program 136 parses through the various recordings, analyzes the recorded travels both in part and in whole, recognizes what pieces of the recordings may be relevant to increasing the user experience with the navigation service, and uses the relevant pieces of the recordings to create the user specific route map.

In another example, a user may have installed a camera on their person, such as on their shoes, to track their movements and the surrounding areas. Previously, the user has used this camera while walking to multiple destinations. Through cognitive analysis, such as creating a threshold of usefulness for how images of the route, the user's movements, and/or the surrounding areas, are useful for increasing the user experience with navigation, navigation program 136 may determine that the camera footage from a previous journey is relevant to the current requested route.

In yet another example, there are recordings of conversations the user had with a friend about landmarks, even though at the time, the user and the friend were not traveling to the destinations. For instance, the user and the friend may have been sitting having dinner at the time. Through cognitive analysis of the available data, such as parsing through the conversation and creating a threshold of usefulness for the various statements, navigation program 136 may determine that parts of the recorded conversations are the user and the friend discussing the requested final destination, or places and landmarks along the requested route. Navigation program 136 may then utilize this data to help personalize the route for the user and creates a user specific route with this personalized information.

In one example of navigation program 136 can create a user specific route map after determining the user has been to the destination before and has had conversations about the destination. The user specific route map may include marked landmark location along the route, details about the landmark (e.g., in text form, image form, or both), and include user-specific data accessed from variable data files 140 or social media data 150. For instance, the directions may include the following: "Go to well-known landmark X on Interstate Z that you have gone to 4 times in the last year, including most recently on Oct. 10, 2015, and that you discussed with James on Oct. 14, 2015. From the landmark, then continue down Interstate Z for 2 miles. Your destination will be on the right." Navigation program 136 may then include, in the user specific route map, the recording of the discussion with James on Oct. 14, 2015. Accordingly, the user can interact with the user-specific route map (e.g., via selecting an option on the user specific route map) and play the recording, as described in greater detail in step 210.

In various embodiments, navigation program 136 may also include any one or more digital images, video files, audio files, etc. from the user's own files, and insert them into the map and directions, in order to help the user recognize the location. For example, when the user is traveling to a destination that they have worn a camera on their person, such as on their shoes, and the camera has taken video of the landmark, and the user has also discussed the landmark with their friend John Smith and recorded the discussion, the directions may include the following: "Go to well-known landmark X on Interstate Z that you have traveled to 4 times in the last year, recorded a discussion about with John Smith on January 28$^{th}$, and took video of on March 3rd". Navigation program 136 includes in the directions the video of the landmark and the audio of the conversation. The user may then interact and view the video of the landmark, listen to the recorded conversation, or both, in order to remind them of the location. If the user has, for instance, forgotten the area or that they journeyed to this destination, the personal information may remind them of their previous journeys.

In an additional example where the user's route ends before a destination the user has traveled to before, such as the John Smith example above, navigation program 136 may cognitively determine that the user has taken video files, audio files, etc. of the location during their journeys to John Smith's house, and embed these files, either fully or in part, into the directions for the user to interact with. In these exemplary embodiments, through cognitive analysis, navigation program 136 may be able to determine the various digital images, video files, audio files, etc. relate to the route and/or the destination, or probably relate to the route and/or the destination, even if not previously used to create route maps, and/or not labeled or specifically stated as relating to the destination.

In step 210, navigation program 136 displays the user specific route map. In this exemplary embodiment, navigation program 136 displays the user specific route map on computing device 130 through such means as UI 132. In various embodiments, navigation program 136 generates an interactive display of the user specific route map. In other words, the user is able to interact with the user specific route map that is displayed. For instance, the user may be able to: play audio or video files that navigation program 136 has included in the directions, such as the user's own audio and video files; zoom in to specific parts of the map; zoom out; interact with certain areas of the map itself, such as the written directions and the marked landmarks, to bring up more information; request voice navigation directions; etc.

FIG. 3A is an example user interface depicting an example of a generic navigation route. In this exemplary embodiment, the user inputs a navigation request to travel from Madhupushpa Apartments to the Diamond Water Park. Navigation program 136 creates a generic navigation route, such as routes 306 and 308, a visual map, and directions, such as directions 302 and 304, that may be displayed if there is no history or other user specific data to be added to the map. In this embodiment, the generic route is the determined generic route (step 204) displayed to any user with no previous history or related data available, who is requesting a route between the two points.

FIG. 3B is an example user interface depicting an example of a user specific route map. In this exemplary embodiment, FIG. 3B depicts the map of FIG. 3A after performing cognitive analysis to create a user specific route map (i.e., step 210). The user inputs a navigation request to travel from Madhupushpa Apartments to the Diamond Water Park. Navigation program 136 creates a user specific route map based off of the generic navigation route (i.e., FIG. 3A) and the user's route history and related data that navigation program 136 has accessed (i.e., step 206). In this embodiment, the user has previously traveled to places along route 354 numerous times. Navigation program 136 includes the user's history and related data by personalizing the directions, such as directions 350 and 352, as well as personalizing the visual elements of the map, such as with graphical element 356. Graphical element 356 may be items such as a graphical icon or button of any shape or color, and may be selected with the use of, for instance, a touch screen, voice selection (e.g., using a microphone), or a pointing device (e.g., a computer mouse). In various embodiments, the user may interact with directions 350 and 352, and/or graphical element 356 to show additional information, such as digital images the user has taken of those locations or of the surrounding areas, video the user has captured using a camera (i.e., step 210), and/or audio files the user has captured. Continuing the example, on a previous trip, the user went with a friend to graphical element 356 and was wearing a camera that captured video of graphical element 356, and audio of the user and the user's friend discussing the location. The user doesn't remember that the previous trip was to graphical element 356, and inputs a navigation request that location. Navigation program 136, through cognitive analysis, determines that the video and audio files are related to the user's requested route. Navigation program 136 embeds the files into the directions and includes an indication on graphical element 356 to alert the user there are content items that are relevant to the user's destination request. In this embodiment, the indication is a "blinking" graphical element 356. In other embodiments, the indication can be based on a color schema. For example, a graphical element with the color "red" could denote accessible, embedded files that are relevant to a user's destination request. In yet other embodiments, the indication can be a text message sent to the user's phone with the embedded files. In this example, the user can interact with graphical element 356 to display the personalized files. By watching and listening to the files, the user can remember the previous destination request as denoted by graphical element 356. Accordingly, the generated display of the user specific route map can increase the user's experience with navigation services by creating personalized routes and maps.

Figure 4:
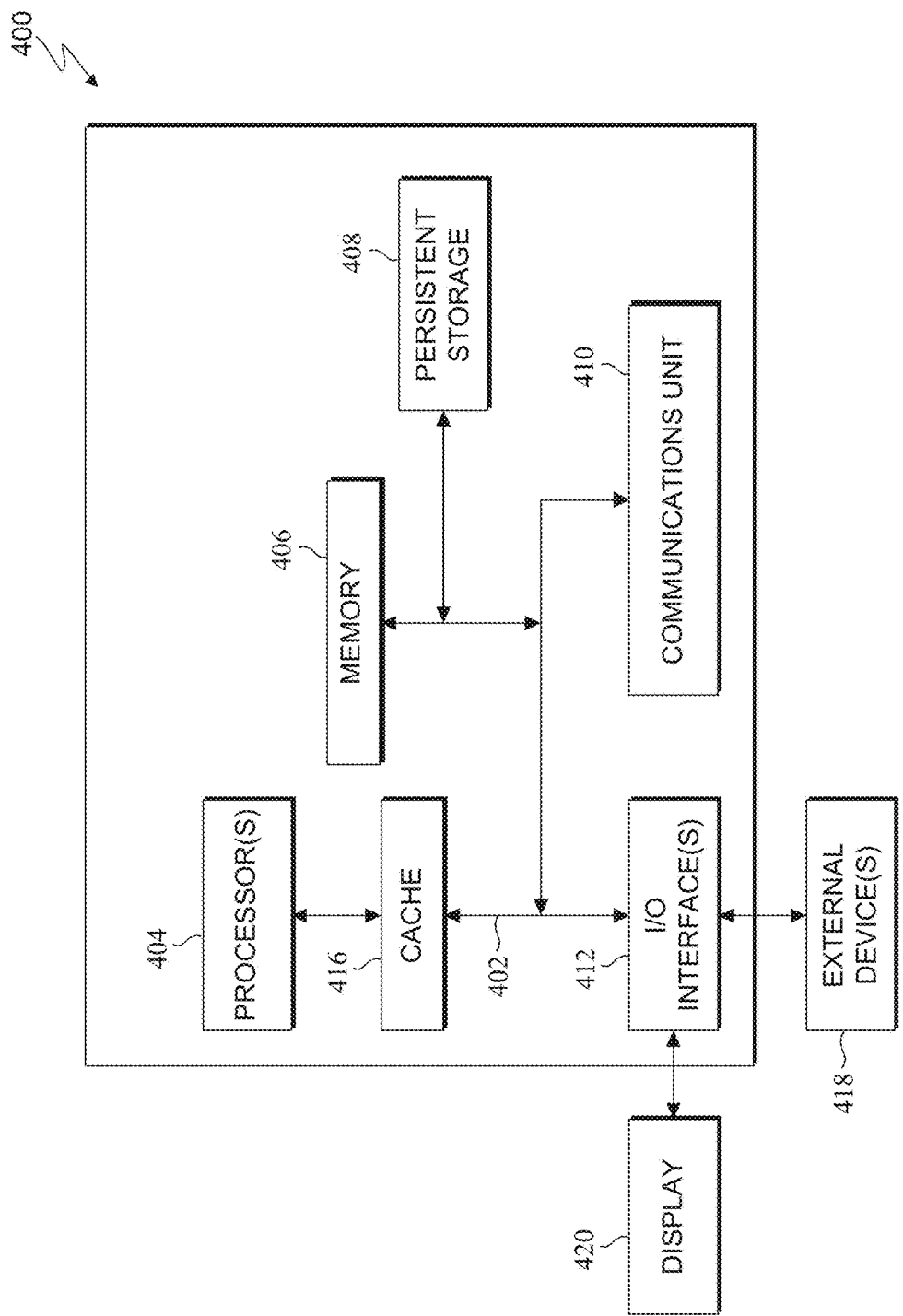
FIG. 4 is a block diagram of internal and external components of the computing device of FIG. 1, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to: personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In general, memory 406 can include any suitable volatile or non-volatile computer-readable storage media. Software (e.g., navigation program 136, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 410 provides for communications with other computer systems or devices via a network (e.g., network 110). In this exemplary embodiment, communications unit 410 includes network adapters or interfaces such as a TCP/IP adapter cards, wireless WLAN interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computing device 130 through communications unit 410 (e.g., via the Internet, a local area network or other wide area network). From communications unit 410, the software and data can be loaded onto persistent storage 408.

One or more I/O interfaces 412 allow for input and output of data with other devices that may be connected to computer system 400. For example, I/O interface 412 can provide a connection to one or more external devices 418 such as a keyboard, computer mouse, touch screen, virtual keyboard, touch pad, pointing device, or other human interface devices. External devices 418 can also include portable computer-readable storage media such as, for example, thumb drives, portable optical or magnetic disks, and memory cards. I/O interface 412 also connects to display 420.

Display 420 provides a mechanism to display data to a user and can be, for example, a computer monitor. Display 420 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for personalizing a navigation route, the method comprising:
   receiving, by one or more processors, a request from a user for a navigation route between two or more points;
   accessing, by one or more processors, navigation data and services;
   creating, by one or more processors, a generic navigation route based, at least in part, on the request from the user and the navigation data and services;
   accessing, by one or more processors, route history and related data for the user;
   modifying the generic navigation route by creating, by one or more processors, a personalized navigation route for the user based, at least in part, on the generic navigation route and the route history and related data for the user,
      wherein the personalized navigation route includes a user display interface that, in response to reaching a respective point along the personalized route, depicts user captured images and audio for each respective point along the personalized navigation route, and
      wherein the related data for the user includes user created or user captured digital images by any device or sensor, user created or user captured videos by any device or sensor relating to the requested navigation route, and social media from the user about locations along the requested navigation route;
   displaying, by one or more processors, the personalized navigation route for the user; and
   navigating, by one or more processors, the user to the request using the personalized navigation route.

2. The method of claim 1, further comprising:
   creating, by one or more processors, a set of directions based on the personalized navigation route for the user.

3. The method of claim 2, further comprising:
   comparing, by one or more processors, the set of directions with the accessed related data for the user;
   creating, by one or more processors, a set of personalized directions based on the comparison of the directions and accessed related data for the user, and including in the set of personalized directions at least part of the accessed related data for the user.

4. The method of claim 3, further comprising:
   creating, by one or more processors, a personalized interactive navigation map based, at least in part, on the personalized navigation route, wherein the user may interact with the included accessed related data for the user.

5. The method of claim 1, further comprising:
   creating, by one or more processors, two or more generic routes based on the request from the user;
   accessing, by one or more processors, the route history and related data for the user; and
   creating, by one or more processors, two or more personalized navigation routes for the user based, at least in part, on the two or more generic navigation route and the route history and related data for the user.

6. The method of claim 1, wherein the navigation data and services include at least one of: GPS satellites; cloud or web based GPS software; cloud or web based maps and mapping software; and cloud or web based navigation software.

7. The method of claim 1, wherein the related data accessed includes one or more contacts for the user, and address information for the one or more contacts; and emails, texts, or SMS about locations along the requested navigation route.

8. A computer program product for personalizing a navigation route, the computer program product comprising:
   one or more computer readable storage medium and program instructions stored on the computer readable storage medium, the program instructions comprising:
   program instructions to receive a request from a user for a navigation route between two or more points;
   program instructions to access navigation data and services;
   program instructions to create a generic navigation route based, at least in part, on the request from the user and the navigation data and services;
   program instructions to access route history and related data for the user;
   program instructions to modify the generic navigation route using program instructions to create a personalized navigation route for the user based, at least in part, on the generic navigation route and the route history and related data for the user,
      wherein the personalized navigation route includes a user display interface that, in response to reaching a respective point along the personalized route, depicts user captured images and audio for each respective point along the personalized navigation route, and
      wherein the related data for the user includes user created or user captured digital images by any device or sensor, user created or user captured videos by any device or sensor relating to the requested navigation route, and social media from the user about locations along the requested navigation route;
   program instructions to display the personalized navigation route for the user; and program instructions to navigate the user to the request using the personalized navigation route.

9. The computer program product of claim 8, wherein the program instructions stored on the computer readable storage medium further comprise:
program instructions to create a set of directions based on the personalized navigation route for the user.

10. The computer program product of claim 9, wherein the program instructions stored on the computer readable storage medium further comprise:
program instructions to compare the set of directions with the accessed related data for the user;
program instructions to create a set of personalized directions based on the comparison of the directions and accessed related data for the user, and including in the set of personalized directions at least part of the accessed related data for the user.

11. The computer program product of claim 10, wherein the program instructions stored on the computer readable storage medium further comprise:
program instructions to create a personalized interactive navigation map based, at least in part, on the personalized navigation route, wherein the user may interact with the included accessed related data for the user.

12. The computer program product of claim 8, wherein the program instructions stored on the computer readable storage medium further comprise:
program instructions to create two or more generic routes based on the request from the user;
program instructions to access the route history and related data for the user; and
program instructions to create two or more personalized navigation routes for the user based, at least in part, on the two or more generic navigation route and the route history and related data for the user.

13. The computer program product of claim 8, wherein the navigation data and services include at least one of: GPS satellites; cloud or web based GPS software; cloud or web based maps and mapping software; and cloud or web based navigation software.

14. The computer program product of claim 8, wherein the related data accessed includes one or more contacts for the user, and address information for the one or more contacts; and emails, texts, or SMS about locations along the requested navigation route.

15. A computer system for personalizing a navigation route, the computer system comprising:
one or more computer processors;
one or more computer readable storage media;
program instructions stored on the one or more computer readable storage media for execution by at least one of the one or more processors, the program instructions comprising:
program instructions to receive a request from a user for a navigation route between two or more points;
program instructions to access navigation data and services;
program instructions to create a generic navigation route based, at least in part, on the request from the user and the navigation data and services;
program instructions to access route history and related data for the user;
program instructions to modify the generic navigation route using program instructions to create a personalized navigation route for the user based, at least in part, on the generic navigation route and the route history and related data for the user,
wherein the personalized navigation route includes a user display interface that, in response to reaching a respective point along the personalized route, depicts user captured images and audio for each respective point along the personalized navigation route, and
wherein the related data for the user includes user created or user captured digital images by any device or sensor, user created or user captured videos by any device or sensor relating to the requested navigation route, and social media from the user about locations along the requested navigation route;
program instructions to display the personalized navigation route for the user; and
program instructions to navigate the user to the request using the personalized navigation route.

16. The computer system of claim 15, wherein the program instructions stored on the computer readable storage medium further comprise:
program instructions to create a set of directions based on the personalized navigation route for the user.

17. The computer system of claim 16, wherein the program instructions stored on the computer readable storage medium further comprise:
program instructions to compare the set of directions with the accessed related data for the user;
program instructions to create a set of personalized directions based on the comparison of the directions and accessed related data for the user, and including in the set of personalized directions at least part of the accessed related data for the user.

18. The computer system of claim 17, wherein the program instructions stored on the computer readable storage medium further comprise:
program instructions to create a personalized interactive navigation map based, at least in part, on the personalized navigation route, wherein the user may interact with the included accessed related data for the user.

19. The computer system of claim 15, wherein the program instructions stored on the computer readable storage medium further comprise:
program instructions to create two or more generic routes based on the request from the user;
program instructions to access the route history and related data for the user; and
program instructions to create two or more personalized navigation routes for the user based, at least in part, on the two or more generic navigation route and the route history and related data for the user.

20. The computer system of claim 15, wherein the related data accessed includes one or more contacts for the user, and address information for the one or more contacts; and emails, texts, or SMS about locations along the requested navigation route.

\* \* \* \* \*